Feb. 14, 1933.  J. E. PORTER  1,897,397
PISTON RING CLOSING FIXTURE
Filed Dec. 28, 1931  2 Sheets-Sheet 1

Inventor
Jay E. Porter
By Liverance and
Van Antwerp
Attorneys

Patented Feb. 14, 1933

1,897,397

UNITED STATES PATENT OFFICE

JAY E. PORTER, OF MUSKEGON, MICHIGAN, ASSIGNOR TO THE PISTON RING COMPANY, OF MUSKEGON, MICHIGAN, A CORPORATION OF MICHIGAN

PISTON RING CLOSING FIXTURE

Application filed December 28, 1931. Serial No. 583,592.

This invention relates to an equalizing closing fixture for use in the manufacture of piston rings.

Closing fixtures for clamping together a number of piston rings and holding the same for the finishing operations on their outer curved surfaces have been used previously. The rings, which have reached the stage in manufacture that out-of-round piston ring castings have had segments cut from one side of each ring to produce partings in the rings, are compressed so as to close said partings and force the rings into substantially circular form; and a plurality of the rings in this compressed state located around an arbor are clamped side by side so as to prevent outward springing movement of the rings which would occur if said clamping was not used. In their compressed clamped condition the same are turned or ground or otherwise finished at their outer curved sides.

In the present invention the closing fixture is for the purpose of getting better completed and finished rings and one in which the rings will be of uniform exterior diameter and have their partings uniform when the rings are closed, the requirements with respect to which are becoming more and more severe as internal combustion engines are perfected to operate at higher speeds and under higher pressures.

Previously the rings at their outer curved surfaces might vary slightly in external diameter or circumference so that when placed in a cylinder the rings on opening or spreading slightly to bear against the inner walls of a cylinder would have their partings open varying distances. Also it has been common in piston rings for the ends of the rings at the partings to project out slightly farther than the remainder of the ring when closed so that on finishing the ring the end portions at the parting are thinned, this being undesirable as the cross section of the ring should be uniform throughout its entire length.

The present invention is concerned with a novel closing fixture which equalizes the position of the rings properly so that when clamped side by side the partings will all be closed uniformly, and as a result certain of the rings may project outwardly slightly farther than the others but when all of the rings carried are machined or otherwise finished at their outer curved surfaces they will have an absolutely uniform circumferential length, have uniform and unvarying partings when used in a cylinder, and at the same time the ends of the rings at the partings will not be thinned but the cross section of any ring will be uniform throughout.

The invention for the attainment of the ends stated is fully described in the following description, taken in connection with the accompanying drawings, in which, Fig. 1 is a plan view illustrating the application of the closing fixture of my invention to a plurality of piston rings.

Like reference characters refer to like parts in the different figures of the drawings.

Figure 2:
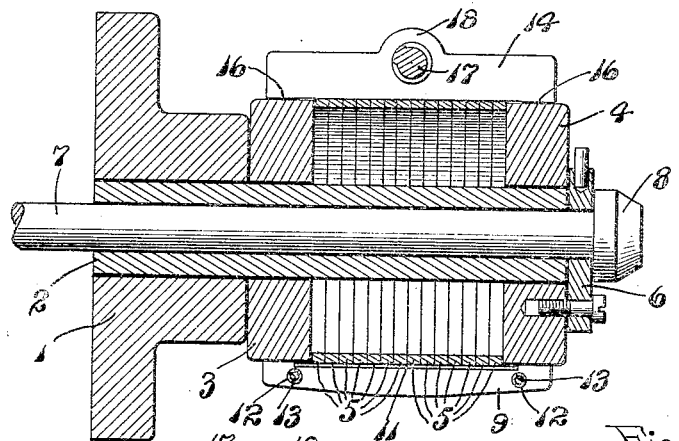
Fig. 2 is a vertical longitudinal section therethrough.
Figure 3:
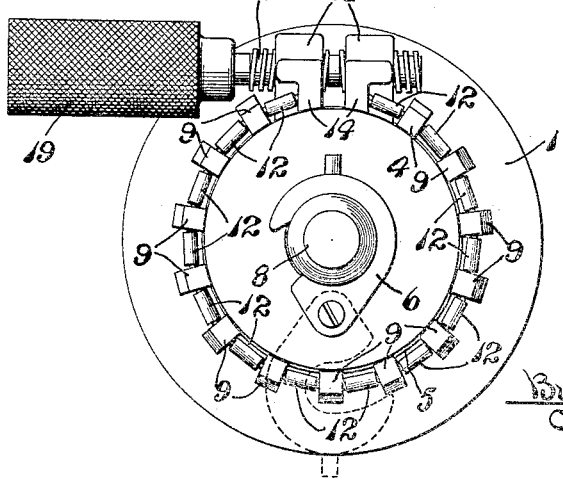
Fig. 3 is an end elevation of the construction shown in Fig. 1 looking against the right-hand end thereof.
Figure 4:
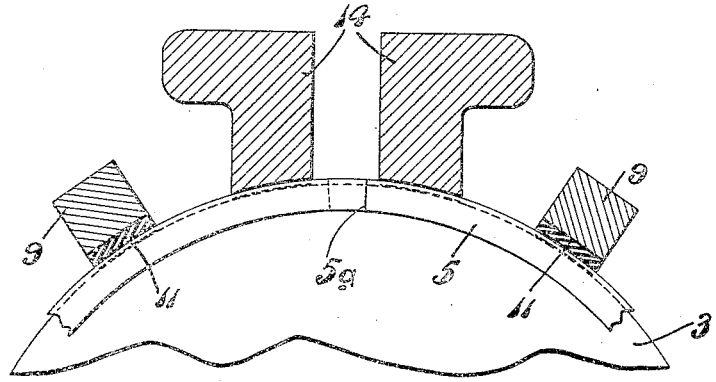
Fig. 4 is a fragmentary enlarged transverse section illustrative of the end bars and the adjacent rubber facing bars of the closing fixture and the manner in which the same engage the rings.
Figure 5:
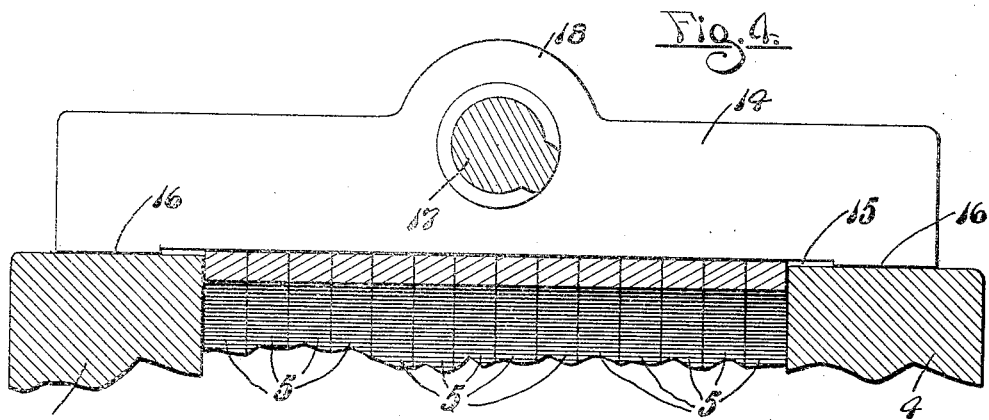
Fig. 5 is a fragmentary enlarged longitudinal vertical section taken substantially on a plane between the two end bars of the fixture.

In the construction shown, a hub member 1 has a sleeve 2 secured at one end thereto and projecting a distance beyond the hub, over which inner and outer clamping collars 3 and 4 are adapted to be placed. The first collar 3 is placed over the sleeve 2 against the end of the hub 1. A plurality of piston rings 5 with their partings all at the upper side are then located side by side against the collar 3, and the collar 4 is then placed over the end of the sleeve 2 against the outer piston ring and secured in place by means of a hook 6 pivotally mounted on collar 4, which may be turned from the dotted line position shown in Fig. 3 upwardly over a rod 7 which passes through the sleeve 2 and which has a head 8 at its outer end, between which and the collar 4 on the end of the sleeve 2 the hook 6 may be located, as shown in Figs. 2 and 3.

Figure 6:
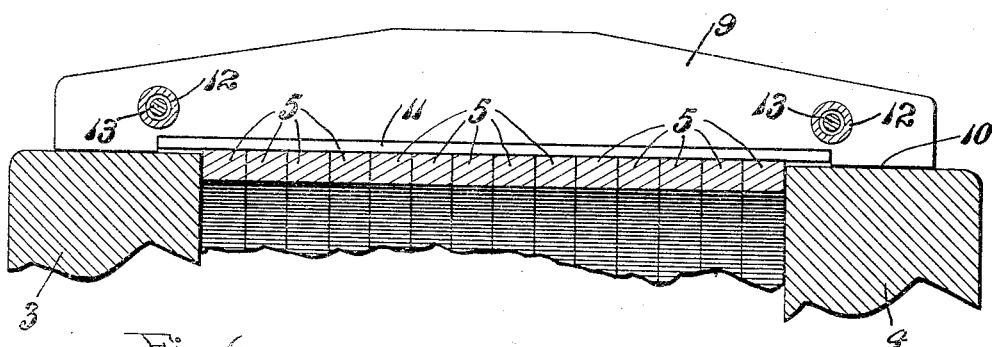
Fig. 6 is a fragmentary enlarged longitudinal vertical section taken between any two of the remaining rubber faced bars of the fixture.

The closing fixture of the present invention comprises a spaced apart series of bars 9 each of which is longitudinally recessed at its inner side, leaving bearing ends 10 to bear against the outer curved surfaces of the collars 3 and 4 (see Fig. 6); and in the longitudinal recess a lining 11, preferably of rubber, is permanently secured, the thickness of the rubber being slightly less than the depth of the recess. For example, the depth of the recess may be seventy-two thousandths of an inch and the thickness of the rubber sixty-two thousandths of an inch, or ten thousandths less than the depth of the recess. The various bars 9 are spaced from each other by sleeves 12 of any suitable material, and through said sleeves and the bars wires 13 pass, the ends of which are permanently secured to end bars 14 of the fixture. This is best shown in Fig. 3.

The end bars 14 are of heavier cross section than the bars 9 and each is recessed longitudinally at its inner side making a shallow recess 15 which is shallower than the recesses made in the bars 9. In fact the depth of the recess 15 is to be as near as practicable equal to the difference between the depth of the recesses in bars 9 and the thickness of the liners or fillers 11 in said recesses; or in the example noted above, the recesses 15 in bars 14 should be the difference between seventy-two and sixty-two thousandths of an inch or ten thousandths of an inch. With such recesses 15 at the inner sides of the bars 14, end bearing surfaces 16 are provided to bear against the collars 3 and 4, the same as the surfaces 10 of bars 9 bear against said collars.

A screw 17 passes through upwardly extending bosses 18 formed on the two end bars 14 of the fixture. This screw has two sections oppositely threaded and the bosses 18 are likewise oppositely interiorly threaded. A knurled handle 19 preferably is connected with the screw 17 for manually turning the same whereby the clamp may be contracted by drawing the end bars 14 toward each other as is evident.

Figure 1:
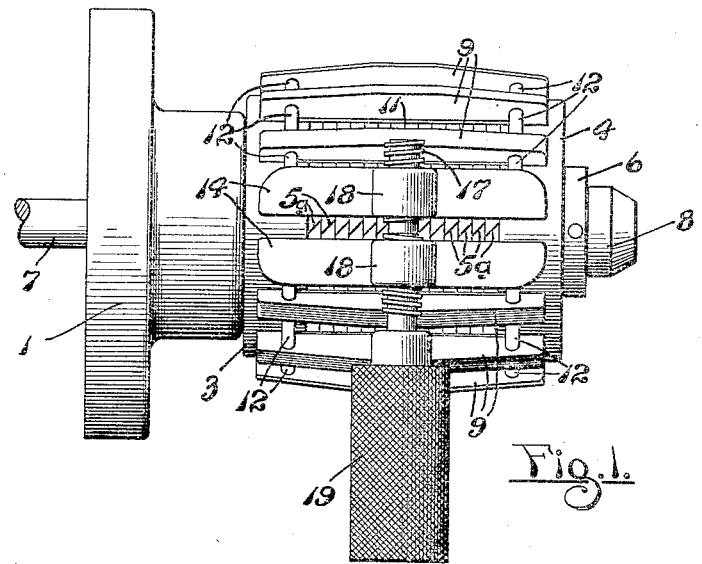

With the plurality of rings 5 having their partings 5a therein in alinement located between the collars 3 and 4, the fixture may be placed over the rings with all the partings 5a located in a plane between the end bars 14 (see Fig. 1). The ends of the rings adjacent the partings come against the inner side of bars 14 at the recesses 15 therein. Tightening the fixture by operating the clamping screw brings the bearing surfaces 10 of bars 9 and the similar bearing surfaces 16 of the bars 14 against the outer curved surfaces of the collars 3 and 4. The rings are thereupon compressed, their partings closed and the ends of the rings at the partings located at their outer surfaces ten thousandths of an inch beyond the adjacent curved surface of collars 3 and 4 and the rings at different points in their lengths bear against the rubber liners 11 of bars 9. If any ring, when closed at its parting, is of slightly greater exterior circumference than other rings, it presses into the rubber liners 11 which yields by reason of the yielding nature of the rubber. Then by pulling longitudinally on the rod 7, after the clamping fixture has been operated to close all the rings at the partings, the head 8 is drawn to the left and the rings clamped securely against each other and held in their closed position ready for the finishing machining operation at their outer sides.

Because of the direct bearing of the end portions of the rings at their partings against the metal of the bars 14 said end portions are pressed inwardly against any tendency to spring farther out than the intermediate portions of the ring. All of the rings will extend at all parts slightly beyond the cylindrical surfaces of the collars 3 and 4 permitting a finishing tool or grinding wheel to move over the outer surfaces of the rings, finishing all of the same to an exact and uniform exterior diameter with all of the partings closed and without variation in the partings or the exterior finished circumferential length of the rings. Also the end portions of the rings will not project out any farther than the intermediate portions of the rings; will not be thinned on finishing and the cross section of any ring will be uniform throughout.

The construction described is very practical and with it better and more uniform rings which have exactly the same partings when in service in a cylinder are produced. The longitudinal movement of the rod 7 is ordinarily produced by connecting the rod to a piston within a cylinder and applying compressed air to the piston. Unclamping the rings from between the collars 3 and 4 after they have been machined is attained by releasing the air pressure. This however is no part of the present invention but is well known practice.

While the bars 9 have been shown lined with a rubber liner 11 at their inner sides, it is of course to be understood that variations in the specific detail may be made without departing from the invention. For instance the bars could be of a cylindrical form with the ends somewhat larger than the intermediate portions and the intermediate portion of each bar covered by rubber tubing; or the bars could be of either a square or rectangular form in cross section and the intermediate portion completely covered by a rubber tube-like enclosure.

The invention is defined in the appended claims and is to be considered comprehensive of all forms of structure coming within their scope.

I claim:

1. An equalizing piston ring fixture comprising, end bars located in parallel relation, each recessed longitudinally at its inner side to within a short distance from each end, a plurality of intermediate bars between the end bars spaced therefrom and from each other, flexible connecting means connecting all the bars together in spaced relation, said intermediate bars being likewise longitudinally recessed at their inner sides to within a short distance of each end, and having deeper recesses than in the end bars, and resilient facing strips secured in the recesses of said intermediate bars.

2. A construction containing the elements in combination defined in claim 1, said resilient strips being of less thickness than the depth of the recesses in said intermediate bars in which they are located by an amount substantially equal to the depth of the recesses in the end bars.

3. In a construction of the class described, a central cylindrical support, spaced apart cylindrical collars on said support, an abutment against which one of said collars engages, a plurality of split piston rings between said collars, and a contractible closing fixture around said piston rings comprising, a plurality of connected spaced apart bars, each having an end bearing against the outer surface of each of the collars, said bars being recessed at their inner sides and having resilient facings therefor to bear against the outer sides of the piston rings.

4. A construction of the class described comprising a cylindrical support, collars thereon spaced from each other, an abutment against which one of said collars bears, and a contractible closing fixture around said rings and collars, said fixture at its ends bearing against the outer sides of the collars and having resilient means to bear against the rings whereby the partings in all of the rings may be completely closed.

5. In a construction of the class described, a closing fixture comprising two substantially parallel end bars located a short distance from each other, connections attached at their ends to said end bars, intermediate bars through which said connections pass, spacers around said connections between the intermediate bars and between each end bar and next adjacent intermediate bar, said intermediate bars having resilient means attached thereto adapted at the inner sides of the bars to engage against the outer sides of parted piston rings, and means for drawing the end bars toward each other to compress said piston rings and close their partings.

6. An equalizing closing fixture for piston rings comprising, two end bars located in parallel relation, each end bar being recessed longitudinally at its inner side to within a short distance from each end, flexible means connected at its ends to said bars and extending from one end bar to the other, a plurality of intermediate bars on said flexible means spaced from each other and from the end bars, said intermediate bars being longitudinally recessed at their inner sides to within a short distance of each end and having deeper recesses than the end bars, facing strips of rubber secured in the recesses of said intermediate bars, and manually operable means connecting the end bars and operating to draw the same toward each other or separate the same from each other, as specified.

7. Means for closing the partings in a plurality of parted rings comprising, a contractible fixture located around the rings, said fixture including yielding means adapted to abut against the intermediate portions of the several rings and non-yielding means adapted to abut against the end portions of the several rings.

In testimony whereof I affix my signature.

JAY E. PORTER.